May 14, 1940.  A. E. SUMMERS  2,200,348
DEVICE FOR GAUGING AND ADJUSTING SPRINGS
Filed July 22, 1938
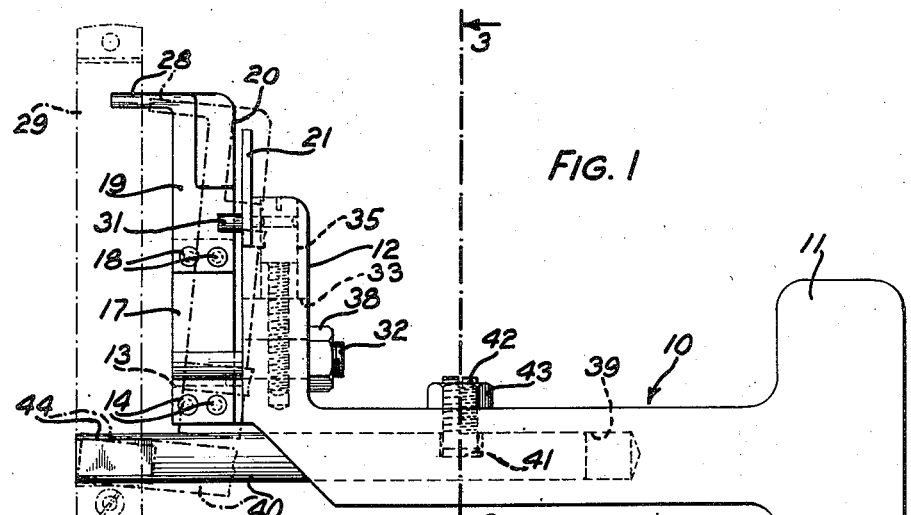
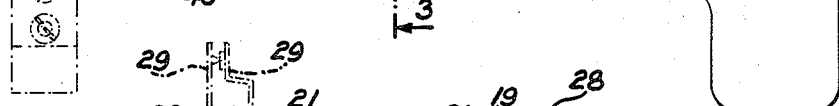
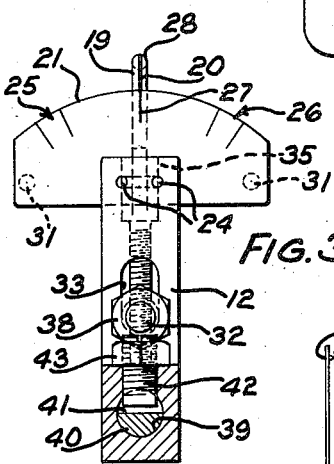
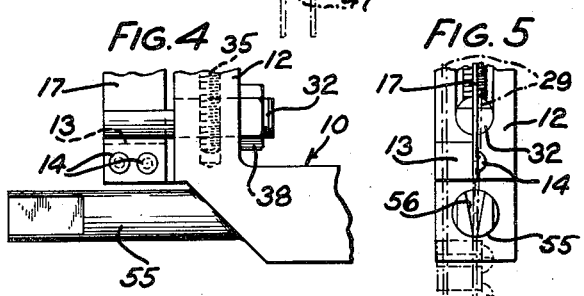
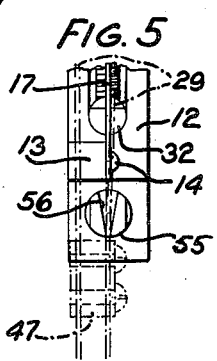
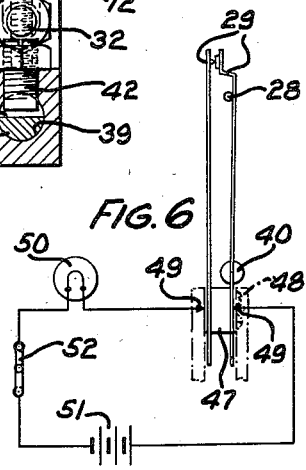
INVENTOR
A. E. SUMMERS
BY Emery Robinson
ATTORNEY Patented May 14, 1940

2,200,348

UNITED STATES PATENT OFFICE 2,200,348

DEVICE FOR GAUGING AND ADJUSTING SPRINGS

Albert E. Summers, Riverside, Ill., assignor to Western Electric Company, Incorporated, New York, N. Y., a corporation of New York Application July 22, 1938, Serial No. 220,643

9 Claims. (Cl. 265—1)

This invention relates to devices for gauging and adjusting springs and more particularly to devices combining means for gauging and adjusting the tension of electrical contact springs.

An object of this invention is the provision of a simple and practical device for efficiently gauging and adjusting the tension of springs.

In accordance with the above object, the present invention, in one embodiment thereof, as applied to gauging and adjusting the tension of electrical contact springs of the leaf type, similar to those used in the telephone art, comprises a hand grip carrying a reed-like element supporting an indicator and member engageable with one end of the contact spring for flexing it, the contact spring being fixed at its opposite end, the indicator cooperating with a scale fixed to the hand grip. By rotating the hand grip, the contact spring will be flexed and the readings of the cooperating pointer and scale noted. An electric signal circuit is provided for indicating whether the tension of the spring is within maximum and minimum limits. An intermediate portion of the contact spring is entered in a slotted head of a spring tension adjusting tool which serves as a fulcrum point for the hand grip, the tool having a limited rotary motion in the hand grip so that relative movement therebetween may take place during the gauging operation without bending the contact spring and when a spring, after being gauged, requires adjustment, the hand grip may be slightly tilted to disengage the member supported by the leaf spring from the upper end of the contact spring and thereafter, by twisting the hand grip one way or the other, the spring may be flexed either to increase or decrease the tension.

Other objects and advantages of this invention will more fully appear from the following detailed description, taken in connection with the accompanying drawing, in which Fig. 1 is a fragmentary side view of a contact spring gauging and adjusting device embodying the features of the invention shown engaged with a spring to be gauged, the fragmentary broken outline of the device being the position thereof during adjustment of the spring;

Fig. 2 is an end view of Fig. 1 looking at the left end thereof;

Fig. 3 is a vertical detail section taken on the line 3—3 of Fig. 1;

Fig. 4 is a fragmentary side view of a device similar to that shown in Fig. 1, but provided with an integral contact spring adjusting tool;

Fig. 5 is an end thereof looking at the left end thereof; and

Fig. 6 is a diagram of the signal circuit and a holding fixture for the springs during gauging and adjusting, the device being shown fragmentarily.

Referring now to the drawing in detail, 10 indicates in general a support or frame for the device provided at one end with a hand grip portion 11, the opposite end having an arm 12. Extending from the arm 12 at one side of its end face is a lug 13, to which is riveted, as indicated at 14, a reed-like spring 17 disposed centrally across the end face of the arm 12. In alignment with and riveted to the upper end of the spring 17, as indicated at 18, is a combined indicating and spring flexing member 19 provided with a knife-like indicating edge 20, which cooperates with an index plate 21 riveted at 24 to the arm 12 adjacent its upper end. The plate 21 is provided with sets of gram or other measurement graduations 25 and 26 (Fig. 3) extending in opposite directions from a central line 27, with which the indicating edge 20 of the member 19 is normally aligned, when the device is idle. The member 19, at its upper end and opposite the indicating edge 20, is provided with an arm 28 of circular cross-section for engaging and flexing a contact spring 29 during the gauging thereof, the movement of the reed-like spring 17 in either direction being limited by stop pins 31 extending from the plate 21. The stop pins 31 do not come into use during gauging operations, but are useful when the device is idle or while being handled to prevent deleterious flexing of the spring 17. For varying the resiliency of the reed-like spring 17, a pin 32 is adjustable in a slot 33 formed in the arm 12 of the support 10, a projecting end of the pin being slotted, as indicated at 34 (Fig. 2), for the reception of the spring 17, which freely extends therethrough. The pin 32 is bodily adjustable in a slot 33 of the arm 12 by means of a shouldered screw 35 carried in the arm 12 and rotatably retained in a fixed position by the rivets 24 used to secure the index plate 21 to the arm, the screw being threaded at its lower end through the pin 32. By rotating the screw 35 in one direction or the other, the pin 32 will be raised or lowered, thus varying its point of engagement with the reed-like spring 17, and thereby varying the resiliency thereof. After the adjustment of the pin 32, it is held in position by a lock nut 38 threaded onto its end projecting from the arm 12.

Fitted for limited rotation in an aperture 39 of the support 10 is a spring tension adjusting member 40. The member 40 is formed with a flat bottomed slot 41 in its upper periphery, into which extends an adjustable screw 42 threaded through the adjacent wall of the support 10, a lock nut 43 serving to hold the screw in its adjusted position. It will be observed that the lower end of the screw 42 is spaced from the bottom surface of the slot 41 (Fig. 3), thus permitting a limited relative rotary motion, depending on the adjustment of the screw, in either direction of the support 10 and the adjusting member 40 before the lower end of the screw 42 will engage the bottom stop surface of the slot, whereupon a continuing movement of the support 10 will carry with it the adjusting member 40. The limited relative rotary motion of the adjusting member 40 and the frame 10, it will be observed, permits movement of the frame during the gauging operation without any bending of the contact spring only a flexing thereof. The adjusting member 40 extends from the left end of the support, as viewed in Fig. 2, and is formed with a parallel sided slot 44 to receive the contact spring 29 to be gauged and adjusted.

In using the device, for example, to gauge and adjust the tension of compactly arranged electrical contact springs 29 arranged in assembled pairs, and referring particularly to Fig. 6 wherein the device is shown fragmentarily, and a holding fixture for the springs together with a signal circuit are diagrammatically illustrated, the springs are insulated from each other at their lower ends by an insulator member 47. A suitable fixture is shown in broken outline at 48 for holding the spring assembly during gauging and adjusting. In mounting the springs 29 in the fixture 48 the springs are engaged under pressure with contacts 49 carried by the fixture and included in the signal circuit which also includes a signal lamp 50 or other indicating means, a source of electrical energy 51 and a switch 52 for opening and closing the circuit, the circuit being closed at the switch during gauging and adjusting.

To gauge the pressure between the upper contacting ends of the springs 29 the device is grasped by the operator by its hand grip 11 and first associated with one of the springs, for example, the right hand one, as viewed in Figs. 2 and 6, by entering the contact spring in the slot 44 of the adjusting member 40 and the inner surface of the spring, adjacent the contacting ends of the springs, in engagement with the arm 28 of the indicating member 19. Thereafter by turning the hand grip 11 clockwise, as viewed in Fig. 2, about the fulcrum point provided by the contact spring 29 entered in the slot 44 of the member 40, the index plate 21 will follow, but the indicating member 19 carried by the reed-like spring 17 will lag due to the resistance of the contact spring 29 in breaking contact with its companion spring 29.

Thus, if the cooperating signal circuit is broken at the upper contacting ends of the springs 29 before the inner gram graduation 25 (Fig. 3) is alined with the indicating edge 20 of the member 19 the signal lamp 50 will be extinguished and this indicates to the operator that the desired contact pressure is lacking and the spring needs adjustment. If the contact pressure is greater than that desired this will be indicated to the operator by the lamp remaining lighted while at the same time the indicating edge 20 of the member 19 will lie beyond the outer gram graduation 25. When the spring being gauged is within maximum and minimum tension limits to provide the proper contact pressure the circuit will be broken at the upper contacting ends of the springs 29 when the indicating edge 20 lies between the inner and outer gram graduations 25 and preferably at a midway point.

To adjust the tension of the spring 29 to provide the desired contact pressure it is merely necessary for the operator to tilt the hand grip 11 of the device, as shown in broken outline in Fig. 1, to free the arm 28 from engagement with the spring to be adjusted and at the same time retaining the fulcrum point provided by the lower end of the spring being entered in the slot 44 of the adjusting member 40. Thereafter by turning the hand grip 11 in one direction or the other depending on whether the tension in the spring 29 is below or above that necessary to provide the desired pressure at the upper contacting ends of the springs 29, the spring is slightly bent and then gauged again, as hereinbefore described, and again adjusted if found necessary until the desired contact pressure is attained. The left hand spring 29, as viewed in Figs. 2 and 6, may be gauged and adjusted in a similar manner, the right hand gram graduations 26 (Fig. 3) being used.

In the embodiment of the invention shown in Figs. 4 and 5, means indicated at 55 for adjusting the tension of springs is fixedly supported on the frame 10 of the device or as shown may be integral therewith, instead of having a limited rotary movement on the device, as described hereinbefore in connection with the adjusting member 40. In the case of the means 55, integral with the frame 10, it is formed at its outer end with a V-shaped slot 56, instead of a parallel sided slot as in the case of the member 40. The width of the slot 56 at its upper end is sufficient to permit the desired movement of the frame 10 during the tension gauging operation without putting any bending strain on the spring being gauged. In adjusting the tension of springs with the means 55 it may be used in a manner identical to the adjusting member 40 previously described.

From the foregoing description, it will be apparent that a simple and practical device is provided for efficiently gauging and adjusting the tension and thereby the contact pressure between compactly arranged electrical contact springs.

It will be understood that the embodiments herein described are merely illustrative of the invention and one application thereof, the invention being limited only by the scope of the appended claims.

What is claimed is:

1. In a device for gauging and adjusting the tension of springs, a support carrying a reed-like element supporting an indicator and a member for flexing a spring to be gauged, a calibrated scale carried on the support for cooperation with said indicator, and means carried by said support for operative engagement with the spring and providing a fulcrum point for the support relative to the spring during the gauging thereof, said means effective for bending the spring to adjust the tension thereof.

2. In a device for gauging and adjusting the tension of springs, a support carrying a reed-like element of predetermined resilient value supporting upon one side at its free end an indicator and at its opposite side a member for flexing a spring to be gauged, a calibrated scale carried on the support for cooperation with said indicator, and means carried by said support for operative engagement with the spring and providing a fulcrum point for the support relative to the spring during the gauging thereof, said means effective for bending the spring to adjust the tension thereof.

3. In a device for gauging and adjusting the tension of springs, a support carrying a reed-like element, means for adjusting the resiliency thereof, said element supporting at its free end an indicator and a member for flexing a spring to be gauged, a calibrated scale carried on the support for cooperation with said indicator, and means carried by said support for operative engagement with the spring and providing a fulcrum point for the support relative to the spring during the gauging thereof, said means effective for bending the spring to adjust the tension thereof.

4. In a device for gauging and adjusting the tension of springs, a support having an angularly disposed arm, a leaf spring of predetermined resilient value fixed at one end to said arm, said leaf spring supporting at its free end an indicator and a member for flexing a spring to be gauged, a calibrated scale carried on said arm at its free end for cooperation with said indicator, and means carried by said support for operative engagement with the spring and providing a fulcrum point for the support relative to the spring during the gauging thereof, said means effective for bending the spring to adjust the tension thereof.

5. In a device for gauging and adjusting the tension of springs, a support having an angularly disposed arm, a leaf spring fixed at one end to said support at one side of said arm, an element supported by and extending from said arm at a point between the ends of said leaf spring, means for varying the position of said element longitudinally of said leaf spring, said element having a slot at its free end for freely receiving said leaf spring, said leaf spring supporting at its free end an indicator and a member for flexing a spring to be gauged, a calibrated scale carried on the support for cooperation with said indicator, and means carried by said support for operative engagement with the spring and providing a fulcrum point for the support relative to the spring during the gauging thereof, said means effective for bending the spring to adjust the tension thereof.

6. In a device for gauging and adjusting the tension of springs, a support carrying a leaf spring supporting at its free end an indicator and a member for flexing a spring to be gauged, a calibrated scale on the support for cooperation with said indicator, means rotatably carried on said support for operative engagement with the spring and providing a fulcrum point for the support relative to the spring during the gauging thereof, and a stop member for limiting the rotary movement of said means in either direction from a predetermined position thereof, said means effective when engaged with said stop member for bending the spring to adjust the tension thereof.

7. In a device for gauging and adjusting the tension of springs, a handle having a vertical arm, a vertically extending leaf spring fixed at its lower end to an outer face of said arm, a member supported on the upper free end of said leaf spring, said member having a vertically extending indicator formed on one edge and an angularly extending arm at an opposite edge for flexing a spring to be gauged, a calibrated scale carried on said outer face of said arm for cooperation with said indicator, means rotatably carried in said handle parallel to and having its outer end aligned with the angularly extending arm of said member, said means having a slot in its outer end for receiving the spring and providing a fulcrum point for the handle relative to the spring during the gauging thereof, and a stop member for limiting the rotary movement of said means in either direction from a predetermined position thereof, said means effective when engaged with said stop member for bending the spring to adjust the tension thereof.

8. In a device for gauging and adjusting the tension of contact springs, a support carrying a reed-like element supporting an indicator and a member for flexing a contact spring to be gauged, a calibrated scale carried on the support for cooperation with said indicator, an electric signal circuit adapted to be operated in response to the flexing of the contact spring which is included in the circuit during the gauging operation to indicate whether the spring is within maximum and minimum tension limits in cooperation with said indicator and scale, and means carried by said support for operative engagement with the contact spring and providing a fulcrum point for the support relative to the contact spring during the gauging thereof, said means effective for bending the contact spring to adjust the tension thereof.

9. In a device for gauging and adjusting the tension of springs, a support carrying a reed-like element supporting an indicator and a member for flexing a spring to be gauged, a calibrated scale carried on the support for cooperation with said indicator, and means carried by said support effective for bending the spring to adjust the tension thereof, said means being so arranged on the support that it engages the spring at a point adjacent the point of support of the reed-like element.

ALBERT E. SUMMERS.